N. DU BRUL.
CIGARETTE MACHINE.
APPLICATION FILED MAR. 7, 1910.
1,133,844.
Patented Mar. 30, 1915.
7 SHEETS—SHEET 1.
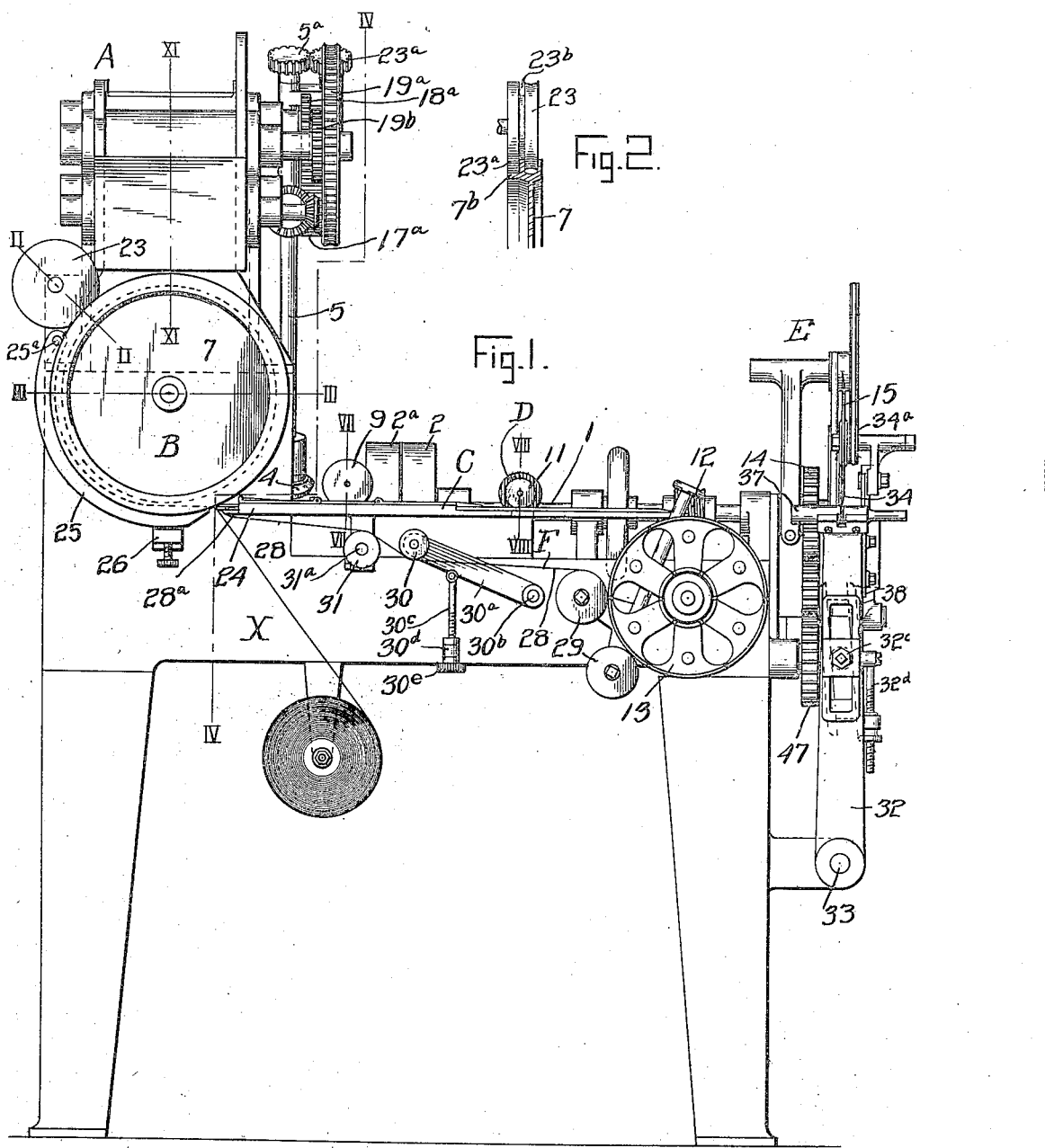
WITNESSES
INVENTOR,
Napoleon DuBrul,
By Knight Bros
Attorneys.

N. DU BRUL.
CIGARETTE MACHINE.
APPLICATION FILED MAR. 7, 1910.
1,133,844.
Patented Mar. 30, 1915.
7 SHEETS—SHEET 2.
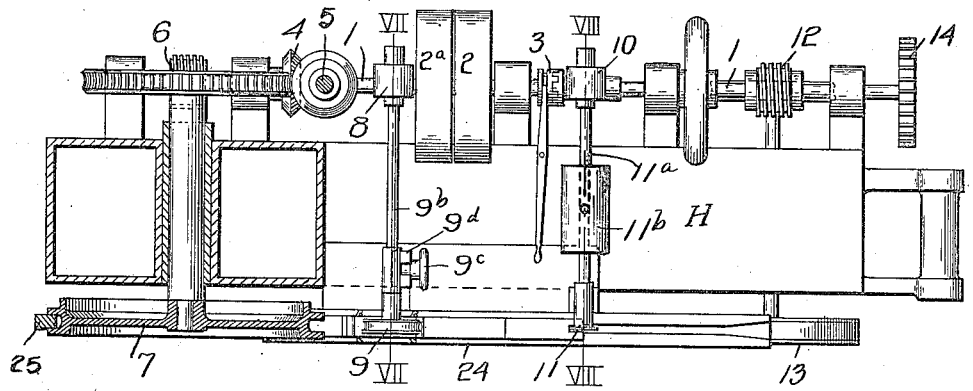
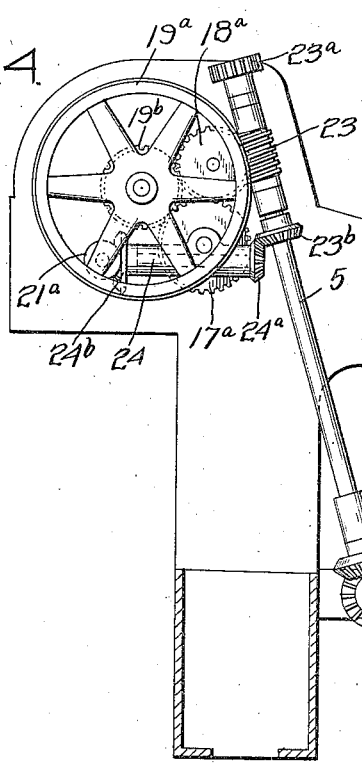
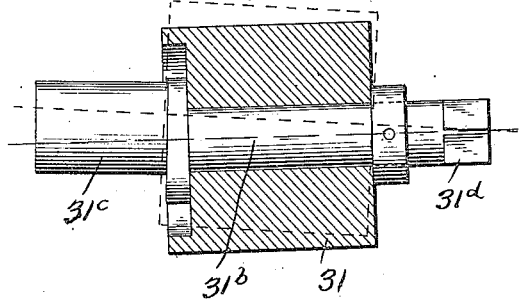
Witnesses
J. M. Skynkoop,
F. B. MacNab.
Inventor
Napoleon DuBrul,
By Knight Bros
Attorneys.

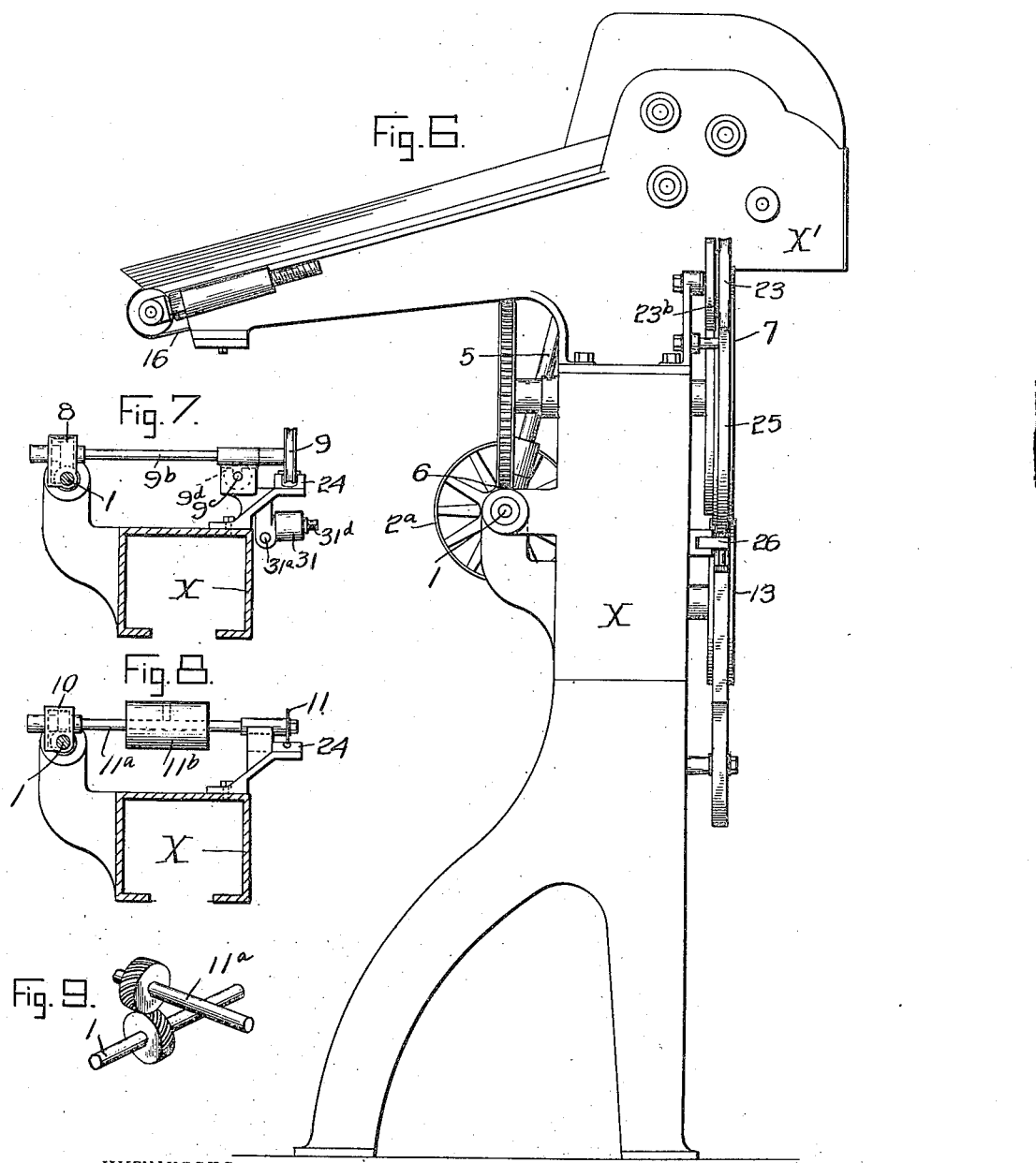

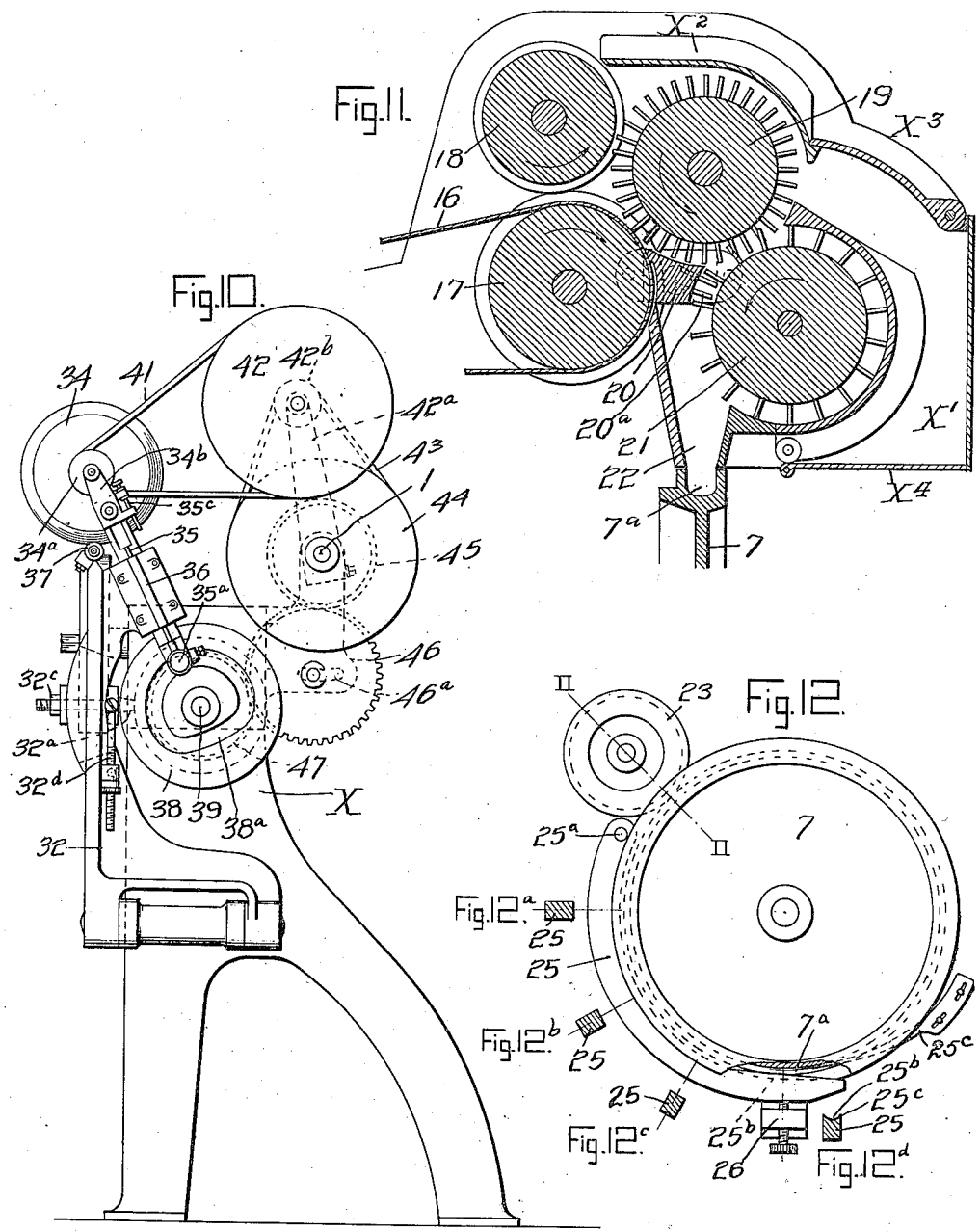

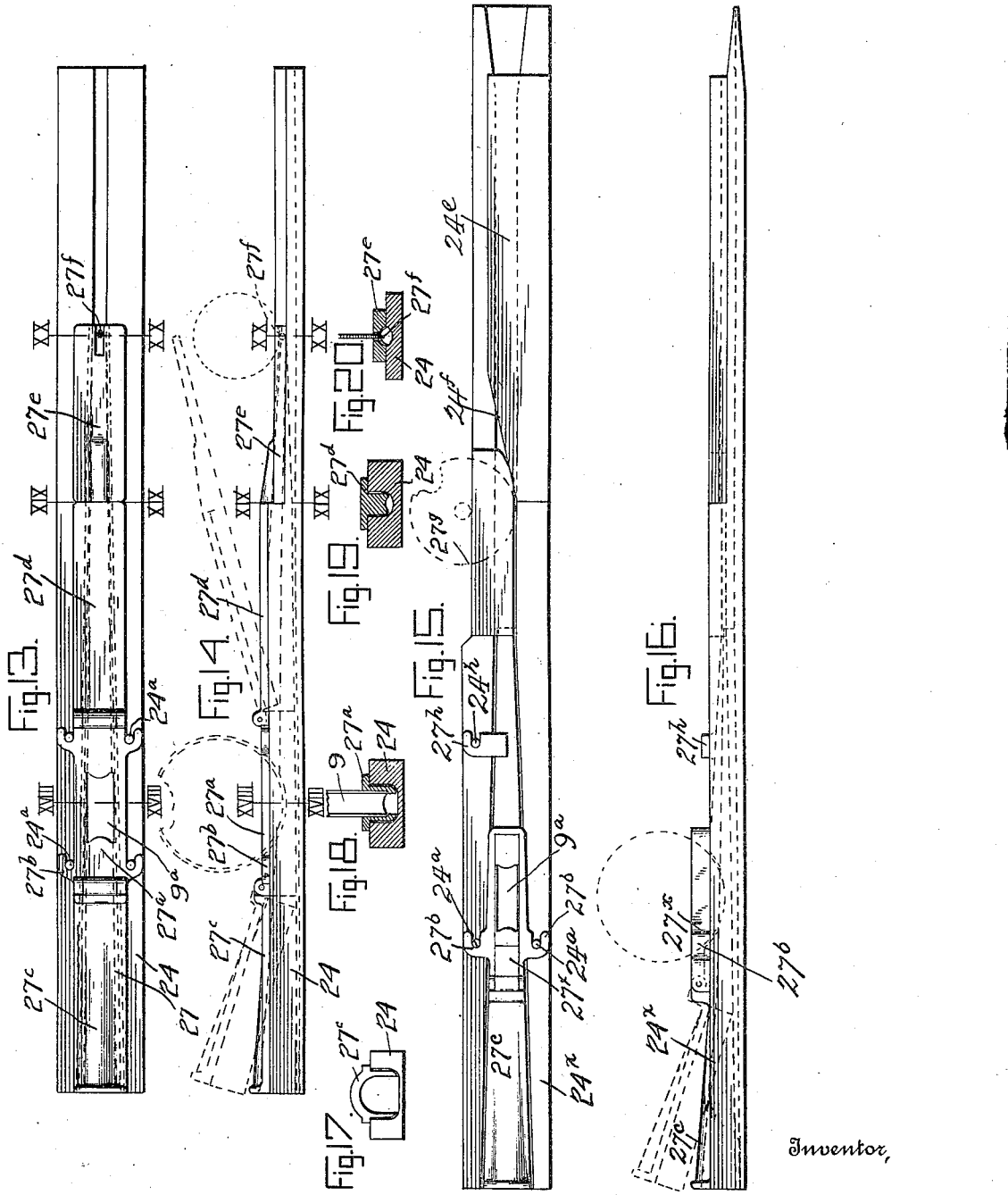

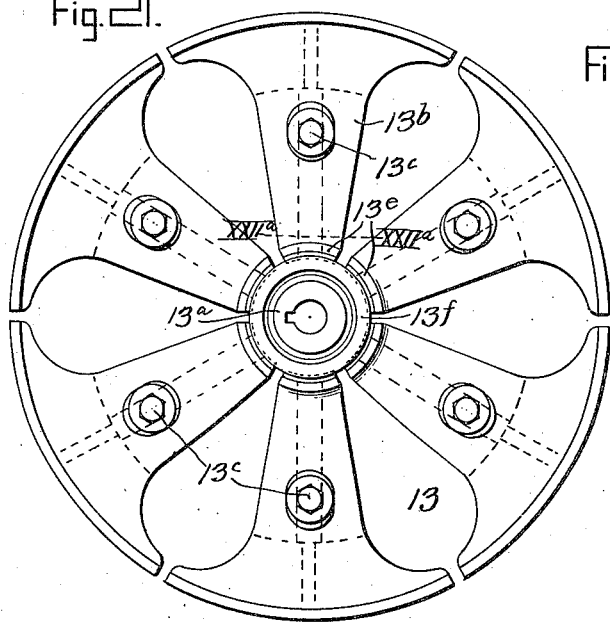
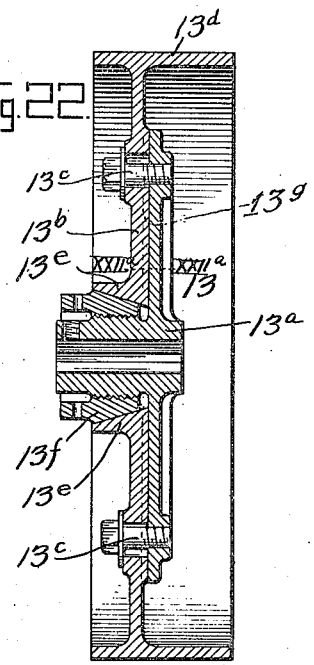
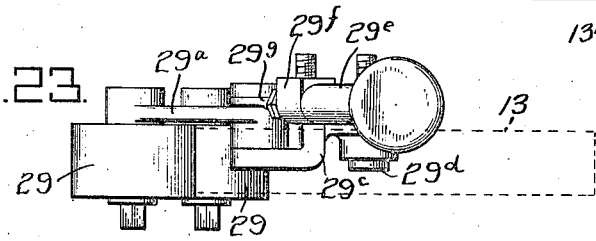
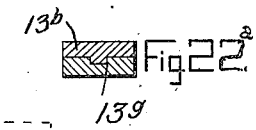
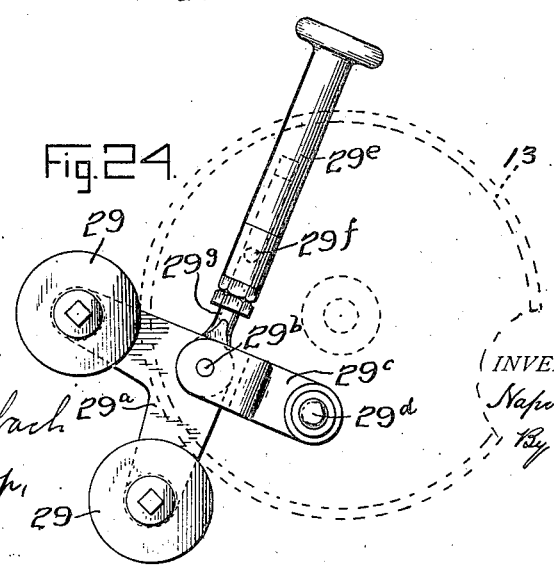

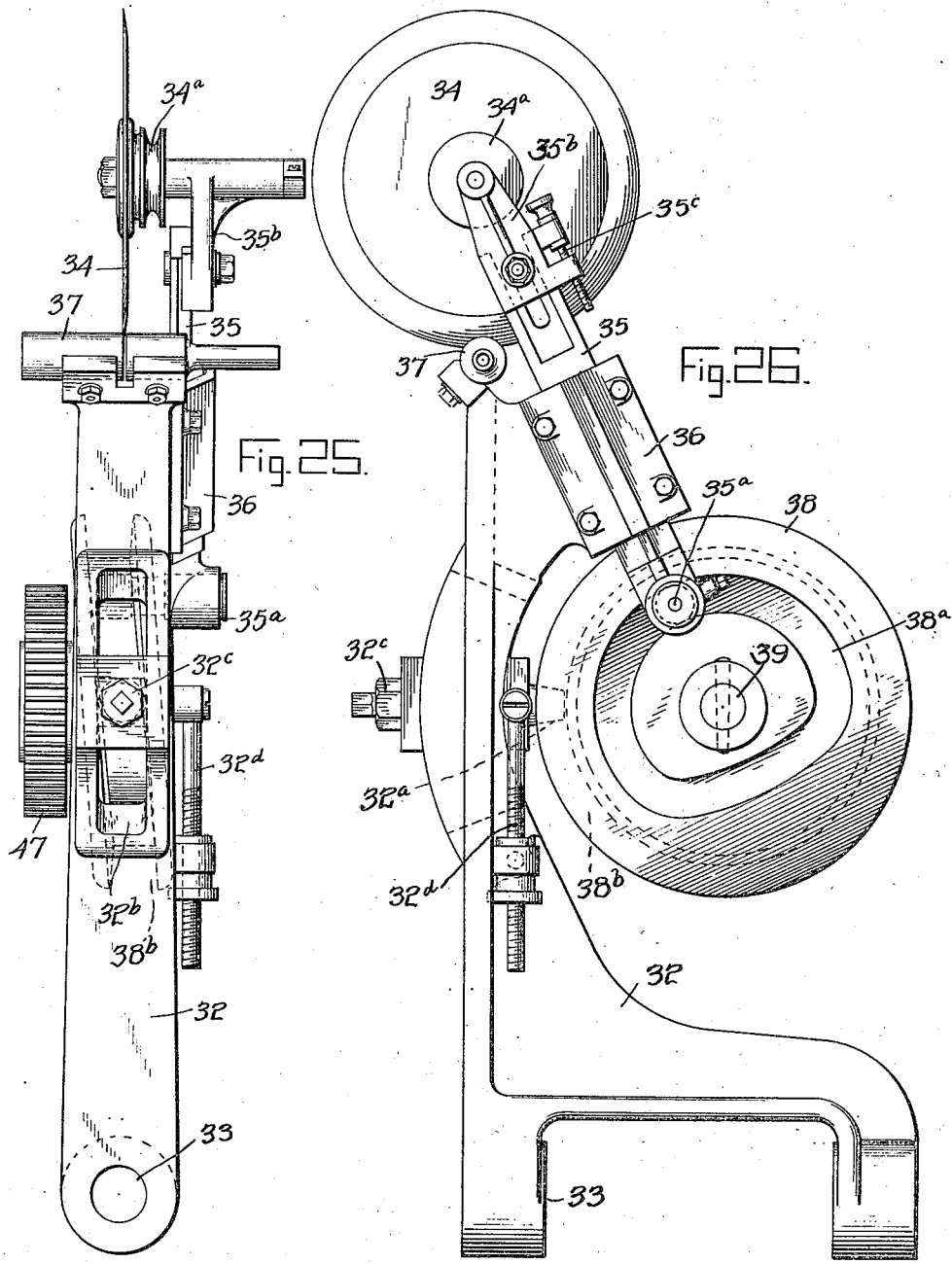

UNITED STATES PATENT OFFICE.

NAPOLEON DU BRUL, OF CINCINNATI, OHIO.

CIGARETTE-MACHINE.

1,133,844.                Specification of Letters Patent.    Patented Mar. 30, 1915.

Application filed March 7, 1910. Serial No. 547,807.

*To all whom it may concern:*

Be it known that I, NAPOLEON DU BRUL, a citizen of the United States, and resident of Cincinnati, in the county of Hamilton and State of Ohio, have invented certain new and useful Improvements in Cigarette-Machines, of which the following is a specification.

This invention relates to continuous cigarette machines in which the tobacco filler is inclosed in a paper wrapper formed from a continuous web of paper and it has for its object to greatly simplify the construction of such a machine, as well as increase its efficiency.

The invention resides in certain novel features of construction and operation of the tobacco feeding and carding means, the rope forming means, the wrapping mechanism, and the severing mechanism, as well as in the combination of these several elements of the machine, as will be hereinafter fully described and particularly pointed out in the claims.

In the accompanying drawings, which represent the preferred embodiment of the several features of the present invention, Figure 1 is a side elevation of the complete machine; Fig. 2 is a detail section taken on the line II—II, Figs. 1 and 12; Fig. 3 is a plan view of the machine with the feeding device and the severing device omitted and the rope forming device shown in axial section on the line III—III, Fig. 1; Fig. 4 is a section on the line IV—IV, Fig. 1, looking toward the left; Fig. 5 is a detail view of the mounting for the tape guiding roller; Fig. 6 is an elevation of the feeding end of the machine; Fig. 7 is a section on the line VII—VII of Figs. 1 and 3; Fig. 8 is a vertical transverse section on the line VIII—VIII of Figs. 1 and 3; Fig. 9 is a detail view of the gearing employed for transmitting motion from the main shaft to each of the transverse shafts shown in Figs. 7 and 8; Fig. 10 is an elevation of the severing and discharge end of the machine; Fig. 11 is an enlarged vertical section through the feeding and carding mechanism, taken on the line XI—XI, Fig. 1; Fig. 12 is an enlarged face view of the rope forming mechanism; Figs. 12$^a$, 12$^b$, 12$^c$ and 12$^d$ are sections through the confining tongue shown in Fig. 12, taken respectively on the section lines which extend through them and through said tongue; Fig. 13 is a top plan view of the form of wrapping tube, preferably employed when the wrappers are crimped; Fig. 14 is a side view of the form of wrapping tube shown in Fig. 13; Fig. 15 is a plan view of the wrapping tube preferably employed when the paper wrapper is to be united by pasting; Fig. 16 is a side view of Fig. 15; Fig. 17 is a view of the left hand end of Figs. 13 to 16; Fig. 18 is a section on the line XVIII—XVIII, Figs. 13 to 16; Fig. 19 is a section on the line XIX—XIX, Figs. 13 to 14; Fig. 20 is a section on the line XX—XX, Figs. 13 and 14; Figs. 21, 22 and 22$^a$ are respectively a face view and an axial section of the expansible tape driving wheel, and a sectional detail thereof on the line XXII$^a$—XXII$^a$, Figs. 21 and 22; Figs. 23 and 24 are respectively a top view and a side elevation of the tape clamping idlers; and Figs. 25 and 26 are respectively, a side elevation and a rear end view of the severing mechanism.

*General arrangement.*—The machine preferably comprises a frame X of any suitable construction but preferably divided up so as to make it readily transportable; also a feeding and carding mechanism A, a rope forming mechanism B, the wrapping mechanism C, the crimping mechanism D (which may be replaced by a suitable pasting mechanism as hereinafter described), the severing mechanism E, and the tape mechanism F. Extending along one side of the bed of the frame X is a main shaft 1 that may be driven in any suitable manner as by fast and loose pulleys 2, 2$^a$ and preferably divided and having its parts connected by a clutch 3, whereby one end of the machine may be operated independently of the other in establishing adjustments. In order that the shaft 1 may drive the several mechanisms of the machine, it is provided with a bevel gear 4 that drives the upwardly extending shaft 5 for the feeding and carding mechanism; a worm gear 6 that is adapted to drive the forming and conveying trough wheel 7 of the rope forming mechanism; an angle gear 8, adapted to drive the pressure wheel 9, which is encountered by the rope immediately after entering the wrapping tube; an angle gear 10, which drives the crimping wheel 11 or its substituted paster, when employed; a worm gear 12, which drives the tape wheel 13; and a gear 14, which drives the severing mechanism E, all as will be hereinafter more fully set forth.

The tobacco feeding and carding mechanism A, as best shown in Fig. 11, comprises a feeding belt 16 passing over a roller 17 and a roller 18 coöperating with the belt to condense the tobacco placed upon the belt as it passes between the rollers; also a pin roller 19 to which the tobacco is fed, and upon which it adheres, and a concave 20, supported by bearing rests 20ᵇ, such as shown in dotted lines, in Fig. 11, in position to lie closely to the belt roller at its upper, inner end to prevent tobacco adhering to the belt and deflecting, and confining the tobacco to the pin roller 19; also a stripping roller 21 having pins upon its surface, which pick the tobacco from the roll 19. Rollers 17, 18 and 19 are preferably run at substantially equal surface speed but roller 21 is a fast roller that cards the tobacco by its fast movement. This carding effect is increased by the provision of fixed teeth 20ᵃ on that portion of the concave 20, which is presented toward the roll 21. The tobacco is deposited by the roll 21 constantly and in a uniform and well divided condition, into the throat 22 by which it is directed to the peripheral conveying trough 7ᵃ on the wheel 7 by which it is delivered to the rope forming mechanism B.

The housing for the feeding and carding mechanism is constructed to provide a dust box X', closed at top by the concave X² and hinging cover X³, and provided at bottom with a hinging door X⁴ for the discharge of dust accumulating therein. The feeding and carding mechanism is driven by the shaft 5 extending upwardly from the bevel gear 4 and provided at top with a pinion 5ᵃ meshing with a pinion 23ᵃ on a short worm shaft 23, which drives the worm wheel 19ᵃ on the shaft of the slow pin roller 19. The latter carries a pinion 19ᵇ, which meshes with a broad pinion 17ᵃ on the shaft of the belt roller 17, and said broad pinion 17ᵃ meshes with and drives the pinion 18ᵃ on the feed roll 18, which lies in a different plane from the pinion 19ᵇ. This arrangement of drive imparts substantially equal surface speed to the rolls 17, 18 and 19. The shaft 23 is further provided with a bevel pinion 23ᵇ, which meshes with a like pinion 24ᵃ on a short shaft 24, which carries at its other end, a pinion 24ᵇ, meshing with a pinion 21ᵃ on the fast or picking pin roll 21. This will impart to the roll 21 a speed much faster than that of the rolls 17, 18 and 19.

*The rope forming mechanism B.*—This comprises the wheel 7 having the peripheral conveying trough 7ᵃ, which receives the tobacco from the throat 22. Immediately after being deposited in the trough 7ᵃ, the tobacco passes beneath the packing and driving wheel 23 (Figs. 1, 2 and 12) by which it is packed into the trough 7ᵃ with the requisite degree of firmness to cause it to travel with the trough in a uniform and continuous rope, until it is delivered to the wrapping tube 24 (Fig. 1) of the former and folder, which it reaches in an unbroken and unbended and otherwise undisturbed condition, in consequence of the rigid character of the trough of the wheel 7, its disposition relatively to the wrapping tube and its direction of rotation; the wrapping tube being thus made to extend from one side of a diameter of the wheel in tangential direction toward which the wheel, at the point of tangent is rotating so that the tobacco rope simply follows its natural course in leaving the wheel on a tangent, as soon as it is released from the wheel.

To confine the rope in the conveying trough without disturbing its texture, a tongue 25, curved substantially concentric to and adapted to fit the trough 7ᵃ, is pivoted at 25ᵃ at its receiving end and held into the trough by the screw 26 at its discharge end, the desired distance to restrict the rope to the proper dimensions prior to entering the wrapping tube.

By referring to Fig. 12, it will be seen that the inner face of the tongue 25 may be made flat, if desired for the greater portion of its length and that it is preferably made with a concave inner face 25ᵇ at its discharge end, whereby the rope is rounded on its outer surface and better adapted to avoid resistance in entering the tube. It will also be seen that the confining face of the tongue, at its discharge end, extends in a straight line where the tangential portion of the path of the rope begins so that the rope is directed into the tube without bending; a scraper 25ᶜ being preferably provided at this end to release the rope from the carrier wheel.

By referring to Fig. 2, it will be seen that the packing and driving wheel 23 is provided with a tread 23ᵃ by which it is adapted to bear against and to be driven by the lateral flange or tread 7ᵇ of the wheel 7; said wheel 23 being provided with a groove 23ᵇ between its packing rim and its tread to receive the wall of the conveying trough. Treads 23ᵃ and 7ᵇ, may be toothed if desired.

*The former and folder.*—This part of the arrangement (Figs. 13 to 20) wherein the tobacco meets the paper borne in by the endless tape, comprises the trough 24 forming the bottom of the wrapping, forming and folding tube and the cover 27, which, for the greater portion of its length forms the side walls and top of said tube. It preferably comprises a stationary central portion 27ᵃ having locking ears 27ᵇ adapted to engage with pins 27ᵃ on the member 24 and the upwardly swinging end members 27ᶜ, 27ᵈ, respectively hinged to the fixed portion 27ᵃ, so that they may be conveniently lifted for inspection of the work and the part 27ᵈ can be detached and replaced when worn. The central portion 27ᵃ is constructed with a recess 9ª to receive an auxiliary forming wheel 9, which reduces the thickness of the tobacco filler prior to entering the finishing tube 27$^d$, (Fig. 19) (see also Figs. 1 and 3) which perfects the form of the filler. The tube thus constructed, gradually tapers from a funnel presented to receive the tobacco rope at the entrance end to an extension 27$^e$ on the finishing tube, where the paper is folded in known manner, after which it passes through the crimping device 27$^f$. The parts 27$^a$, 27$^c$ and 27$^d$ provide channels between their side walls and the walls of the trough 24, which constitute the guides for the paper in order to confine the tobacco to its channel and also to prevent accumulation of dust on the paper preliminary to seaming. Figs. 15 and 16 show the tube modified in a known manner to adapt it for forming a pasted seam, in which use, paste would be applied at the location suggested by the dotted pasting wheel 27$^g$, Fig. 15. The funnel tube 27$^x$ is supported on the base 24$^x$ by the rear hooks 27$^b$, engaging the pins 24$^a$, and has a hinged rear section 27$^c$ as in Figs. 13 and 14, but the other end is rigid and is sustained by the hook 27$^h$, engaging the pin 24$^h$. Beyond the pasting wheel 27$^g$ in the direction of feed is the depressing plate 24$^e$ whose inclined edge 24$^f$ lays the pasted edge to complete the wrapper.

The auxiliary forming wheel 9 is driven through a shaft 9$^b$ from the gear 8; the wheel 9 being held in working position by means of the clamp screw 9$^c$ entering the bracket 9$^d$. Since the gear 8 is constructed as illustrated in Fig. 9, the shaft 9$^b$ of the wheel 9 may be swung upwardly to permit removal of the upper portion of the wrapping tube when desired.

The crimping wheel 11, which coöperates with the small nurling wheel at the extreme forward end of the tongue of the finishing tube, is carried by the shaft 11$^a$, which is driven through the gear 10, also constructed as shown in Fig. 9 so that the shaft 11$^a$ may swing in a vertical plane; a weight 11$^b$ being adjustably mounted on the shaft 11$^a$ to develop the desired pressure of the wheel 11 over the nurling wheel.

*The paper feeding mechanism F.*—This comprises the usual endless tape 28 passing around the roller 28$^a$ at the receiving end of the forming and folding or wrapping device, and the driving wheel 13 driven by the worm gear 12 as already explained and located at the rear end of the tape's travel. In order to increase the friction between the belt 28 and the wheel 13, the clamping idlers 29 are provided, which, as shown in Figs. 23 and 24, are mounted on a carrier 29$^a$, which is pivoted at 29$^b$, to the hanger 29$^c$, which is in turn pivoted to a fixed point 29$^d$; and an adjusting sleeve 29$^e$ having bearing against the pivoted bearing bracket 29$^f$, and threaded on the tension shank 29$^g$, which is pivotally connected with the carrier 29$^a$. Obviously by screwing the adjusting sleeve 29$^e$ on the shank 29$^g$, the latter is drawn upward through the fixed bracket 29$^f$ and the idlers 29 are made to press more firmly against the periphery of the wheel 13.

*Tape tensioning.*—In order to tension the tape 28, it is made to pass beneath a roller 30 mounted in an arm 30$^a$, which is pivoted at 30$^b$ on a fixed part and provided with a tension rod 30$^c$ passing through the fixed bracket 30$^d$ beneath which and threaded upon the rod is the adjusting nut 30$^e$.

*Tape guide.*—In order to guide the tape 28 and prevent it running unevenly in the guide provided for it and the paper in the forming and folding tube, it is passed over a deflecting roller 31 mounted within a fixed bracket 31$^a$ in a manner best understood upon reference to Fig. 5. 31$^b$ represents the journal for the roller 31, which is carried eccentrically by a supporting post 31$^c$, which enters the clamping bracket 31$^a$ and may, when said bracket is loosened, be rotated by a suitable tool applied to the squared end 31$^d$, until that portion of the periphery of the roller, over which the tape 28 travels, can be presented at any desired angle and the tape thereby caused to run to one side or the other and thus made to assume its proper position in the forming and folding tube. Hence the roller 31, mounted as described becomes an adjusting means for the tape.

*Tape speed adjuster.*—In order to adjust the speed at which the tape travels, the wheel 13, which drives the tape is made adjustable in diameter. To these ends, said wheel is built up of a central hub or spider 13$^a$ and radially adjustable segments 13$^b$ mounted upon the respective arms of the spider through the medium of radial tongues and grooves 13$^g$ as shown in section, in Fig. 22$^a$, and secured thereto by means of slots and set screws 13$^c$; said segments being each constructed with a rim forming section 13$^d$ and a section of an inner tapered flange 13$^e$, while the hub of the spider has threaded externally upon it a wedging sleeve 13$^f$ that is adapted to force the segments 13$^b$ radially outward. It is very important to be able to accurately adjust the surface travel of the tape and through it the paper in order to agree with the feed of the tobacco, and considerable advantage is gained by facilitating this adjustment since the feed of the tobacco is largely dependent upon its condition of moisture.

*Severing device.*—In the manufacture of cigarettes in the form of a continuous rod, on a commercial scale, it is necessary to provide accurate and efficient severing means capable of operating at a very high rate of speed; also to have the cutter travel with the cigarette rod so long as it intersects the path of the rod, in order to avoid buckling the rod. For these reasons, it is very desirable to have a severing device of simple and durable construction. Again the length of the individual cigarettes cut off from the constantly advancing rod is determined by the frequency with which the severing device dips into or intersects the path of the rod; in other words, the length of rod that is permitted to feed past the severing point before the knife intersects; hence in order to adapt the machine to cut cigarettes of different length, means are provided for determining the period of the cutting stroke relatively to the feed of the cigarette rod. This is accomplished by simply varying the speed of the cycle of movements executed by the cutter. This in turn gives rise to the desirability of an adjustment in the length of the throw of the cutter in the direction of the feed of the rod, since it is obvious that if the cutter is executing its cutting movement more slowly, it remains in the path of the rod a longer time and, therefore, its throw in the direction of the feed should be slightly longer to prevent buckling the rod.

With these and other ends in view, the severing device comprises a frame 32 mounted upon a transverse pivot 33, which adapts it to swing longitudinally of the machine, or in the line of feed; a cutter 34 mounted upon the frame through the medium of a vertical slide 35 working in a bearing 36 on the frame, whereby the cutter may be drawn downward to intersect the path of the cigarette through the guide tube 37, mounted upon the upper end of the frame; and a cam wheel 38 having a face groove $38^a$ engaging a pin $35^a$ on the slide 35 to impart reciprocating movement to the slide and through it to the knife, and a peripheral groove $38^b$ engaging a pin $32^a$ on the frame 32 in a manner to oscillate said frame on its pivot 33 through an angle, which will cause the knife 34 to move with the tobacco rod during the interim of intersection.

The guide tube 37 shown in Figs. 25 and 26 has a bore of substantially the same diameter from end to end. The greater exterior diameter for a portion of the length is for the purpose of providing a suitable body of metal for mounting the tube.

The knife 34 is a rotary blade having a pulley $34^a$ that receives a belt 41 from the large wheel 42 supported by the arm $42^a$, angularly adjustable concentrically with the main shaft 1 to tighten the belt 41, and having a smaller rim $42^b$ that receives a belt 43 from another large wheel 44 that is on the main shaft 1. In this manner, a very rapid rotation is imparted to the knife 34. The upper portion $35^b$ of the slide 35 is adjustable relatively to the lower portion by means of a set screw $35^c$. In this manner, the relation of the cutting edge to the path of the cigarette may be determined to a nicety in placing the knife in position originally and whenever it has been reduced in diameter by regrinding.

To drive the cam 38, shaft 1 carries a pinion 45, which meshes with an idler 46 through which motion is transmitted to a pinion 47 carried by the cam shaft 39. In order to change the relative speed of rotation of the cam 38, and thereby determine the length of cigarettes to be cut off, the gear wheel 47 is made removable and interchangeable with gear wheels of different sizes, for which reason idler 46 is mounted in a slot $46^a$ concentric with the main shaft 1, carrying the gear wheel 45 with which the idler meshes. This adapts the idler to establish driving relation between the gear wheel 45 and any size of pinion 47 that may be found desirable. The pin $32^a$ extends through a slot $32^b$ in the frame 32 and is clamped in position by a nut $32^c$, against the inner and outer faces of said frame in order to raise and lower the pin relatively to the fulcrum or pivot 33, and thereby amplify or reduce the throw of the upper end of the frame and the parts carried by the frame to conform to the feed of the cigarette rod during the interim of intersection of its path by the knife. The inner and outer faces against which the pin $32^a$ is clamped are curved concentric with the cam shaft 39 so that the pin $32^a$ retains its radial relation to the cam wheel at whatever adjustment it is placed, and does not impair its bearing in the peripheral cam groove. To regulate the adjustment of the pin $32^a$ to a nicety, the frame carries a set screw $32^d$ working in a fixed bearing on the frame and connected with the pin as shown.

*Novel coöperation of different mechanisms.*—Aside from the novelty residing in the several mechanisms *per se*, different mechanisms coöperate to produce novel effects. Thus not only does the feeding and carding mechanism deposit tobacco in proper condition, but being disposed at right angles to the trough wheel and made to correspond in width to the arcuate extent of the upper portion of said wheel upon which the tobacco will effectively deposit by gravity, and being timed to advance the tobacco at the proper speed relatively to the rotation of the trough wheel, it insures the proper thickness of the rope, which accumulates as the wheel rotates through said arcuate space, and then permits the rope, which thus accumulates, to travel half a revolution of the wheel, where it tends to drop by gravity into the tangential path by which it proceeds straight to the forming and folding tube. Again the tape tightener 30 not only properly determines the tension of the tape, but by its adjustment, it permits the enlargement of the tape driving wheel without making the tape too tight or too loose; moreover its preferred location, as shown near the angularly adjustable tape guiding wheel 31, insures a better control of the latter over the tape. In like manner, the tape clamping idlers 29 are radially adjustable in order to permit of establishing the proper driving relation between the tape and the wheel 13, at whatever size the wheel 13 may be adjusted to.

The adjustment of the time or period of cutting motion not only has its effect in determining the length of the cigarette, but it affords especial advantage when used in connection with a machine having the adjustable wheel 13, whereby the speed of the tape may be determined at will and through it the rapidity with which the cigarette rod is delivered. Again the several adjustments in the cutting period and in the amplitude of the cutter frame, bear especial relation to the adjustment of the speed of the tape aside from the facility, which they offer for changing the length of the cigarette, in that they admit of being adjusted to maintain a constant length of cigarette when the tape is adjusted to correspond with the condition of the tobacco.

I claim:—

1. In a cigarette machine, the combination of the feeding and carding mechanism having a substantially vertical discharge throat, a circumferentially continuous unobstructed rotary conveying trough disposed in a plane at right angles to the feeding and carding mechanism and having the upper segment of its trough presented beneath the feed throat, whereby tobacco is deposited by gravity into the trough during its traverse beneath the feed throat, a packing and driving wheel entering the trough immediately beyond the point of deposit of the tobacco, condensing the tobacco deposited in the trough, and means receiving and guiding the tobacco away from the conveying trough at its lowermost point and in a line tangential to the trough at said point, whereby the tobacco rope formed in the trough is received from the trough without bending.

2. In a cigarette machine, means for delivering tobacco, a rotary conveying trough receiving said tobacco, a packing and driving wheel entering said trough at a point above the horizontal diameter of the rotary trough and condensing the tobacco therein immediately beyond the point at which the tobacco is deposited in the trough and a tongue fitting the trough beyond said packing and driving wheel, terminating at the point of removal of the tobacco from the trough.

3. In a cigarette machine, means for delivering tobacco, a rotary conveying trough receiving said tobacco, a packing and driving wheel entering said trough at a point above the horizontal diameter of the rotary trough and condensing the tobacco therein immediately beyond the point at which the tobacco is deposited in the trough, a tongue fitting the trough beyond said packing and driving wheel, terminating at the point of removal of the tobacco from the trough, and a stripping tongue entering the trough of the wheel above the tongue at the end of removal.

4. In a cigarette machine, means for feeding tobacco, a rotary conveying trough receiving the tobacco, a packing wheel entering the trough at a point above the horizontal diameter of the rotary trough and immediately beyond the point at which it receives the tobacco and packing the tobacco therein, and means receiving the tobacco rope thus formed at a point remote from the packing wheel and in a direction tangential to the wheel at the point where the tobacco is taken off and in a line forming a continuation of the movement of the tobacco.

5. In a cigarette machine, an unobstructed rotary conveying trough having a portion of its circumference presented in position to receive tobacco, a packing wheel entering said trough above the horizontal diameter of the rotary trough and immediately beyond the receiving point and packing the tobacco in said trough, means receiving the tobacco rope thus formed at a point remote from the packing wheel and in a line extending tangential from said point in continuation of the direction in which the tobacco reaches the point, and a confining tongue extending between the packing wheel and the point of taking the tobacco rope from the trough.

6. In a cigarette machine, an unobstructed rotary conveying trough of constant dimensions with rigid sides, having a portion of its circumference presented in position to receive tobacco therein, a packing wheel entering the trough and pressing the tobacco into driven relation with the trough at a point immediately beyond where the tobacco is received, means for confining the tobacco rope thus formed, in the trough without disturbing its texture, until it reaches a point of discharge remote from the packing wheel, and means for guiding the tobacco rope away from the trough in a line tangential to the point of leaving the trough and in continuation of the direction in which the tobacco is moving when it reaches the point of discharge.

7. In a cigarette machine, a rotary conveying trough, and a packing wheel entering said trough to condense the tobacco therein; said rotary trough and packing wheel having driving treads in contact exterior to said trough, whereby the packing wheel is rotated with the trough.

8. In a cigarette machine, a wheel having a conveying trough, a packing wheel entering said trough to condense the tobacco therein and having a circumferential groove to receive one wall of the trough, and a tread exterior to said groove, standing in driven relation to a portion of the troughed wheel.

9. In a cigarette machine, a forming and folding tube comprising a suitable base forming the lower portion of the tube, and a cover forming the upper portion of the tube, said cover comprising a funnel tube section, and a tube section to which said funnel tube section is hinged.

10. In a cigarette machine, a forming and folding tube comprising a suitable base forming the lower base portion of the tube, and an upper cover portion of the tube; said cover portion comprising a fixed section and a finishing end section hinged to the fixed section.

11. In a cigarette machine, a forming and folding tube comprising a suitable base forming the lower portion of the tube and a cover forming the upper portion of the tube; said cover or lower portion comprising a fixed section and funnel and finishing sections hinged to said fixed section.

12. In a cigarette machine, a forming and folding tube having a hinged section and a fixed section; said fixed section being provided with a slot, and an auxiliary forming wheel working through the slot in said fixed section upon the tobacco within the tube to reduce the thickness of the rope.

13. In a cigarette machine, a forming and folding tube provided with a slot, an auxiliary forming wheel working through said slot upon the tobacco in the tube, a shaft carrying said forming wheel and driving connections for said shaft, said shaft and its mounting being adapted to be swung upwardly out of the plane of the folding tube to remove the forming wheel from the slot.

14. In a cigarette machine, a forming and folding tube having a removable cover formed with a slot, an auxiliary forming wheel working through said slot against the tobacco in the tube, a shaft carrying said wheel and a driving connection, said shaft and wheel being mounted to be swung upwardly out of the plane of the removable cover to permit removal of the cover.

15. In a cigarette machine, a forming and folding tube, an auxiliary forming wheel working upon the tobacco in said tube, a shaft carrying said forming wheel, adapted to be swung upwardly, a bearing for said shaft, a bracket having a seat for said bearing with means for releasably securing the bearing in the bracket.

16. In a cigarette machine, a forming and folding tube having a finishing end and a crimping wheel coöperating with said finishing end, a shaft free to yield in a direction away from the work, said shaft carrying said crimping wheel, and a weight carried by said shaft for imposing pressure through the crimping wheel upon the wrapper to be crimped.

17. In a cigarette machine, a folding tube, a crimping wheel coöperating with said folding tube, a shaft carrying said crimping wheel, a driving connection for said shaft, which permits the shaft with its wheel to be bodily removed from its work and a weight adjustably mounted on said shaft for regulating the pressure of the crimping wheel to its work.

18. In a cigarette machine, a forming and folding tube, a wheel coöperating therewith, a shaft carrying said wheel, a driving shaft, and a connection between the driving shaft and the wheel carrying shaft, which permits the shaft and wheel to be bodily swung upwardly from its work.

19. In a cigarette machine, a forming and folding tube, a wheel coöperating therewith, a shaft carrying said wheel, a driving shaft, and a connection between the driving shaft and the wheel carrying shaft, which permits the latter with its wheel to be swung bodily upwardly from its work; said driving connection comprising spirally toothed gears having their axes at right angles to each other.

20. A cigarette machine having seam-forming mechanism, and provided in advance thereof with a forming and folding tube having a channel for the wrapper paper and a channel for the tobacco, coinciding with the channel for the wrapper paper at bottom but separated therefrom at the sides.

21. A cigarette machine having seam-forming mechanism, and provided in advance thereof with a forming and folding tube comprising a base having a channel therein and a cover secured over the channel of the base, and having sides projecting into the channel but spaced from the sides of the channel to provide separated lateral guides for the paper.

22. A cigarette machine having seam-forming mechanism, and provided in advance thereof with a forming and folding tube having a central passage for tobacco, lateral passages separated from the sides of the tobacco passage for receiving and guiding the wrapper paper, and a finishing end.

23. A cigarette machine having seam-forming mechanism, and provided in advance thereof with a forming and folding tube having a central passage for tobacco, lateral passages separated therefrom for receiving and guiding the side portions of wrapper paper, and a finishing end; the passages for receiving and guiding the paper being closed at top for the main portion of the length of the tube but extending around the finishing end to permit the paper to be closed together.

24. In a cigarette machine, a tape guiding roller mounted with its axis angularly adjustable relatively to the traveling direction of the tape to change the plane of its guiding surface relatively to the plane of the tape.

25. In a cigarette machine, a tape guiding roller, a spindle upon which said roller is adapted to rotate, a shank on said spindle, having its axis at an angle to the axis of the spindle, and a clamping socket for said shank.

26. In a cigarette machine having a tape, a tape guide mounted upon an axis substantially transverse to the direction in which the tape travels, means for angularly adjusting said axis, and a belt tightener adjacent to said guide and holding the tape thereon and causing it to respond to the adjustment thereof.

27. In a cigarette machine, a diametrically variable tape driving wheel and a tape tightener for compensating the belt for changes in the diameter of the belt driving wheel comprising a pivoted carrier, a pair of rollers mounted on opposite sides of the pivot of said carrier and bearing respectively over the periphery of the variable driving wheel and against the free portion of the belt, and means for adjusting said carrier.

28. In a cigarette machine, the combination with a tape driving wheel, a pressure device comprising an angular frame, idlers connected to the ends of the angular frame and bearing, respectively, over the driving wheel and a free part of the tape, a pivoted link having its free end pivotally connected with said frame between the idlers, and a set screw mounted in a fixed bearing and having connection with said frame.

The foregoing specification signed at Cincinnati, Ohio, this twenty-first day of February, 1910.

NAPOLEON DU BRUL.

In presence of—
 DAVILO S. DU BRUL,
 JOHN H. SAUERBREY.